United States Patent [19]

Anders et al.

[11] Patent Number: 5,017,391

[45] Date of Patent: May 21, 1991

[54] PACKAGED FOODSTUFF CONTAINING A LACTATE SALT

[75] Inventors: Robert J. Anders, Middleton; John G. Cerveny; Andrew L. Milkowski, both of Madison, all of Wis.

[73] Assignee: Oscar Mayer Foods Corporation, Madison, Wis.

[21] Appl. No.: 448,341

[22] Filed: Dec. 11, 1989

Related U.S. Application Data

[60] Division of Ser. No. 287,252, Dec. 20, 1988, Pat. No. 4,888,191, which is a continuation of Ser. No. 120,769, Nov. 13, 1987, Pat. No. 4,798,729, which is a continuation of Ser. No. 808,319, Dec. 12, 1985, abandoned.

[51] Int. Cl.$^5$ .................... A23L 1/315; A23L 1/325
[52] U.S. Cl. .................... 426/129; 426/643; 426/644
[58] Field of Search ............ 426/332, 264, 265, 268, 426/532, 325, 326, 412, 281, 129, 643, 644

[56] References Cited

U.S. PATENT DOCUMENTS

| | | | |
|---|---|---|---|
| 3,658,551 | 4/1972 | Bundus et al. | 426/332 |
| 3,852,486 | 12/1974 | Wacker et al. | 426/332 X |
| 3,934,044 | 1/1976 | Busch et al. | 426/332 |
| 4,011,346 | 3/1977 | Ernst | 426/332 |
| 4,075,357 | 2/1978 | Szezesniak et al. | 426/332 |
| 4,212,894 | 7/1980 | Franzen et al. | 426/332 |
| 4,262,027 | 4/1981 | Tonner et al. | 426/332 |
| 4,576,825 | 3/1986 | Tracy et al. | 426/332 X |
| 4,798,729 | 1/1989 | Anders et al. | 426/326 |

FOREIGN PATENT DOCUMENTS 2324672 5/1975 Fed. Rep. of Germany.

OTHER PUBLICATIONS

Patent Abstracts of Japan, vol. 9, No. 32 (C-265) [1977], Feb. 9, 1985; and JP-A-59 175 870 (Shiyouwa Sangyo K.K.) 04-10-1984.

FSTA Journal, 83-12-r0877, No. 83075100; D. S. Kim et al.; "Effect . . . humectants," and Bulletin of the Korean Fisheries Society, vol. 15, No. 1, pp. 74-82, 10 ref. 1982.

"Sodium Lactate in Meat Products", C. V. Chemie Combinatie Amsterdam C.C.A.

Krol, "Meat Products", Voedingsmiddelentechnologie, 1972, pp. 157, 158.

Troller, J. A., and Christian, J. H. B., Appendix B, Water Activity and Food, Academic Press, New York, 1978.

*Primary Examiner*—Arthur L. Corbin
*Attorney, Agent, or Firm*—Joseph T. Harcarik

[57] ABSTRACT

This invention pertains to poultry or fish foodstuffs wherein lactate salt is added in an amount effective to delay *Clostridium botulinum* growth.

11 Claims, No Drawings

PACKAGED FOODSTUFF CONTAINING A LACTATE SALT

This is a division of co-pending application Ser. No. 07/287,252, filed Dec. 20, 1988, now U.S. Pat. No. 4,888,191, which is a continuation of application Ser. No. 07/120,769, filed Nov. 13, 1987, now U.S. Pat. No. 4,798,729, which is a continuation of application Ser. No. 06/808,319, filed Dec. 12, 1985, now abandoned.

BACKGROUND OF THE INVENTION

1. Field of the Invention

This invention relates to poultry and fish foodstuff containing lactate salt in amounts effective to delay *Clostridium botulinum* growth.

2. Description of the Prior Art

The preservation of foodstuff has many aspects. For example, it has been suggested to add sodium lactate to meat products, such as ham and sausage at levels of approximately 1 to 3%. It is suggested that the sodium lactate lowers the $a_w$ of the foodstuff and has a bacteriostatic effect which results in a better shelf life during refrigeration, a possibility of storage without refrigeration and a possibility of lowering the sodium chloride content of the foodstuff resulting in a better taste without the decreased shelf life. Sodium lactate, however, has not been suggested as an agent for controlling or delaying *Clostridium botulinum* growth.

The need to control *Clostridium botulinum* occurs in foodstuffs such as meats and poultry which are packaged and cooked, but not sterilized, in anaerobic plastic barrier packages. Under temperature abuse, *Clostridium botulinum* may grow and produce toxin. Injury to humans resulting from this bacteria has been relatively rare since there are various means for preventing its growth. For example, high temperature processing of foodstuffs prior to packaging or after packaging will destroy the *Clostridium botulinum*. Other means for controlling the *Clostridium botulinum* have been to refrigerate the foodstuff and to add agents such as sodium nitrite to foodstuff such as bacon. The sodium nitrite while delaying the growth of *Clostridium botulinum* also forms a durable red pigment in the meat. This red coloring is desirable in many foodstuffs such as pork and beef products but is undesirable in other products such as poultry and fish.

While the control of food *Clostridium botulinum* has been successful, it is desired to find additional methods of controlling *Clostridium botulinum* without occuring side effects such as red coloring described above.

SUMMARY OF THE INVENTION

This invention pertains to foodstuff selected from the group consisting of fish and poultry which contains a lactate salt in amounts effective to delay *Clostridium botulinum* growth.

It has been found that when sodium lactate is added to poultry or fish foodstuffs, growth of *Clostridium botulinum* in the foodstuff is delayed but the foodstuff is not colored red by the sodium lactate salt.

DETAILED DESCRIPTION OF THE INVENTION

The foodstuffs included in this invention are non-red meat foodstuff such as fish and poultry wherein the poultry includes meats such as turkey and chicken. This invention is particularly useful when the fish or poultry is packaged in anaerobic conditions such as packaged whole meat or when the fish and poultry is packaged with other foodstuffs such as refrigerated meals and soups.

The lactate salt employed in this invention includes salts such as sodium lactate, calcium lactate, potassium lactate and ammonium lactate. Preferably the lactate salt is sodium lactate. The lactate salts are employed in amounts effective to delay *Clostridium botulinum* growth. The amount of a lactate salt effective to delay botulinum growth can be determined by a simple abusive temperature test procedure.

Foodstuffs that are to be protected by the lactate salt are stored at 80° F. A control is utilized wherein no lactate salt or other *Clostridium botulinum* delay agent is used. The product is then treated with levels of lactate salt. The products are analyzed at various time periods. The levels of the lactate salt which delay the toxin formation compared to the control are amounts which are effective for delaying the *Clostridium botulinum* growth.

In general these amounts range from about 1 to about 7% lactate salt and preferably are in the range from about 1.5 to 3.5 lactate salt.

The lactate salt may be incorporated into the foodstuff by a wide variety of procedures. For example, the lactate salts may be added into the foodstuff either in a concentrated form or as a solution such as an aqueous solution. The lactate salts may be mixed directly into the foodstuff or may be injected into the foodstuff utilizing injection needles.

After the lactate salts are added to the foodstuff the foodstuff may be packaged in anaerobic plastic barrier packages and then heated to temperatures sufficient to cook the foodstuff but not sufficient to sterilize the foodstuff. Cooking the foodstuff below sterilization temperatures is desirable for the quality of the cooked foodstuff but *Clostridium botulinum* may later grow if temperature abused. The added lactate salts will, however, delay *Clostridium botulinum* growth. Other processing means may also be used such as cooking the foodstuff with the lactate salt added and then packaging. In this process the concerns for *Clostridium botulinum* growth are lessened but the added lactate salt is effective for delaying *Clostridium botulinum* growth.

It has also been found that while the lactate salts delays the growth of *Clostridium botulinum*, they do not add any coloring to the meat such as a red coloring.

While the lactate salts may be added as sole agent for delaying *Clostridium botulinum*, the lactate salts may be added in combination with other agents which delay *Clostridium botulinum* growth such as sodium chloride or sodium nitrite. In such cases the amount of lactate salts added will be reduced and the effective amount of lactate salt will be the amounts which delay *Clostridium botulinum* in combination with the other growth delaying agents.

The following examples are further presented to describe the invention, but it is to be understood that the invention is not to be limited to the details described therein.

EXAMPLE I

In these examples, a turkey batter was prepared by grinding turkey breasts and mixing salt at 1.4 wt % and phosphate at 0.49 wt %. *Clostridium botulinum* spores were added to the turkey batter. The batter was divided into aliquots. Some of the aliquots were designated controls, and no sodium lactate was added. To the other aliquots were added sodium lactate in varying amounts as indicated in Table I below. The inoculated aliquots were vacuum packaged, and water cooked to an internal temperature of 160° F. The cooked turkey products were then cooled to 80° F. and incubated at that temperature. Periodically, the product was removed and tested for toxin. The results of the test are shown in Table I.

TABLE I

Effect of Sodium Lactate on *C. botulinum* in Temperature Abused Cook-In Turkey

| Percent Lactate | Days at 80° F. | | | | | | |
|---|---|---|---|---|---|---|---|
| | 2 | 4 | 5 | 7 | 8 | 9 | 10 |
| 0 (Control) | 0/5[a] | 5/5 | | | | | |
| 2.0 | 0/5 | 2/5 | 5/5 | | | | |
| 2.5 | 0/5 | 0/5 | 0/5 | 5/5 | | | |
| 3.0 | 0/5 | 0/5 | 0/5 | 4/5 | 5/5 | | |
| 3.5 | 0/5 | 0/5 | 0/5 | 0/5 | 0/5 | 2/5 | 5/5 |

[a] number of toxic samples/number of samples examined.

From these results it is clear that sodium lactate added at the amounts indicated delays the growth of *Clostridium botulinum*.

EXAMPLE II

According to this example 1,000 lbs. of fresh trim turkey breasts are injected with sodium lactate at a weight percent of 2.5% sodium lactate. The turkey breasts range from about 2.5 to about 3.75 lbs. The turkey breasts are injected with a brine solution comprising the following: 69.50% water; 22.49% sodium lactate syrup (60% sodium lactate; 40% water); 6.16% salt and 1.85% sodium phosphate. For each pound of turkey breasts there is injected 0.2274 lbs. of brine using a Townsend Model 1400 type injector.

The turkey breasts are placed on a rack in a oven and cooked at high humidity at 160° F. dry bulb, for 2 hours and then at 170° F. dry bulb, until the internal temperature of the turkey breasts is 155° F. (approximately 15 minutes). The oven is turned off, but not opened and a solution of 2 lbs. of a commercial caramel powder and 13 lbs. of water is introduced to the oven through atomizing nozzles along with air over a period of 45 minutes. The turkey breasts are then removed from the oven, chilled and packaged.

What is claimed is:

1. In a packaged foodstuff, said foodstuff being selected from the group consisting of fish and poultry, said fish or poultry being cooked, but not sterilized, being packaged in an anaerobic plastic barrier package and intended to be stored under refrigeration, said foodstuff being subject to the growth of *Clostridium botulinum* under temperature abuse, the improvement wherein the foodstuff comprises a lactate salt in an amount of from 1 to 7% by weight and sufficient to delay growth of *Clostridium botulinum* in the foodstuff.

2. A packaged foodstuff according to claim 1 wherein the foodstuff is poultry.

3. A packaged foodstuff according to claim 2 wherein the foodstuff is turkey.

4. A packaged foodstuff according to claim 1 wherein the lactate salt is in an amount from about 1.5% to about 3.5%.

5. A packaged foodstuff according to claim 1 wherein the lactate salt is selected from the group consisting of sodium lactate, calcium lactate, potassium lactate and ammonium lactate.

6. A packaged foodstuff according to claim 5 wherein the lactate salt is sodium lactate.

7. A packaged foodstuff according to claim 5 wherein the lactate salt is calcium lactate.

8. A packaged foodstuff according to claim 5 wherein the lactate salt is potassium lactate.

9. A packaged foodstuff according to claim 5 wherein the lactate salt is ammonium lactate.

10. A packaged foodstuff according to claim 1 wherein said foodstuff is packaged in said anaerobic plastic barrier package prior to being cooked.

11. A packaged foodstuff according to claim 1 wherein said foodstuff is cooked prior to being packaged in said anaerobic plastic barrier package.

* * * * *

REEXAMINATION CERTIFICATE (2255th)
United States Patent [19]
Anders et al.

[11] B1 5,017,391

[45] Certificate Issued * Mar. 29, 1994

[54] PACKAGED FOODSTUFF CONTAINING A LACTATE SALT

[75] Inventors: Robert J. Anders, Middleton; John G. Cerveny; Andrew L. Milkowski, both of Madison, all of Wis.

[73] Assignee: Oscar Mayer Foods Corporation, Madison, Wis.

Reexamination Request:
No. 90/003,105, Jun. 25, 1993

Reexamination Certificate for:
Patent No.: 5,017,391
Issued: May 21, 1991
Appl. No.: 448,341
Filed: Dec. 11, 1989

[ * ] Notice: The portion of the term of this patent subsequent to Jan. 17, 2006 has been disclaimed.

Related U.S. Application Data

[60] Division of Ser. No. 287,252, Dec. 20, 1988, Pat. No. 4,888,191, which is a continuation of Ser. No. 120,769, Nov. 13, 1987, Pat. No. 4,798,729, which is a continuation of Ser. No. 808,319, Dec. 12, 1985, abandoned.

[51] Int. Cl.$^5$ .................. A23L 1/315; A23L 1/325
[52] U.S. Cl. .................................. 426/129; 426/643; 426/644
[58] Field of Search ............ 426/129, 264, 268, 281, 426/265, 332, 325, 326, 532, 412, 643, 644

[56] References Cited
U.S. PATENT DOCUMENTS

4,285,980  8/1991  Lewis ................................ 426/249
4,421,823  12/1983  Theisen ............................. 428/349
4,592,892  6/1986  Ueno et al. ......................... 422/28

FOREIGN PATENT DOCUMENTS

59-175870A  10/1984  Japan.

OTHER PUBLICATIONS

Angersbach, Dr. H., Systematische mikrobiologische und technologische Untersuchungen zur Verbesserung der Beschaffenheit vom Tier stammender Lebensmittel, Feb. 1971, pp. 205–210 (translation included).

Lee, S. H., et al., "Factors Affecting Inhibition of *Clostridium botulinum* in Cured Meats," J. Food Sci., 43(5):1371 (1978).

Purac, Inc.'s "Citizen Petition" to the FDA, May 22, 1998.

Reid, T. F., "Lactic Acid and Lactate in Food Products," Food Manufacturing (Oct., 1969).

Tompkin, R. B. et al., "Causes of Variation of Cured Meats," Applied and Environmental Microbiology 35(5):886 (May, 1978).

Maas, M. R., "Sodium Lactate Delays Toxin Production by *Clostridium botulinum* in Cook-in-Bag Turkey Products," Applied and Environmental Microbiology, 55(9):2226 (1989).

Troller, J. A. and Christian, J. H. B. Water Activity and Food, Academic Press (1978) pp. 86–89.

45 Fed. Reg. 32324 (May 16, 1980).
49 Fed. Reg. 35366 (Sep. 7, 1984).
45 Fed. Reg. 10317 (Feb. 15, 1990).
58 Fed. Reg. 4067 (Jan. 13, 1993).
48 Fed. Reg. 8086 (Feb. 25, 1993).
50 Fed. Reg. 6252 (Feb. 14, 1985).

*Primary Examiner*—Arthur L. Corbin

[57] ABSTRACT

This invention pertains to poultry or fish foodstuffs wherein lactate salt is added in an amount effective to delay *Clostridium botulinum* growth.

REEXAMINATION CERTIFICATE ISSUED UNDER 35 U.S.C. 307

NO AMENDMENTS HAVE BEEN MADE TO THE PATENT.

AS A RESULT OF REEXAMINATION, IT HAS BEEN DETERMINED THAT:

The patentability of claims 1-11 is confirmed.

* * * * *